United States Patent Office 3,535,351
Patented Oct. 20, 1970

---

3,535,351
ALKYL CYANOPERFLUOROALKANOATES
Edwin Dorfman and William E. Emerson, Grand Island, N.Y., assignors to Hooker Chemical Corporation, Niagara Falls, N.Y., a corporation of New York
No Drawing. Filed Aug. 17, 1967, Ser. No. 661,241
Int. Cl. C09f 1/00
U.S. Cl. 260—404                                     7 Claims

ABSTRACT OF THE DISCLOSURE

New alkyl ω-cyanoperfluoroalkanoates of the formulae:

$$NC(CF_2)_x-\underset{\underset{O}{\parallel}}{C}-O-C_nH_{2n+1}$$

and $$NC(CF_2)_x-\underset{\underset{O}{\parallel}}{C}-O-A$$

where $x$ is from 1 to 12, $n$ is from 1 to 25, and A is aryl-substituted methyl of 7 to 21 carbon atoms, are produced from treatment of the corresponding amidates with $P_2O_5$. They are useful intermediates in the preparation of perfluoroalkylenetriazine polymers.

---

This invention relates to new compositions of matter classified as alkyl ω-cyanoperfluoroalkanoates of the formulae:

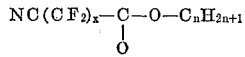

and

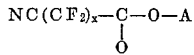

from 1 to 25, and A is aryl-substituted methyl of 7 to 21 carbon atoms. The compounds are prepared by treatment of the corresponding amidates with $P_2O_5$.

Illustrative compounds embraced by this invention are:

methyl ω-cyanohexafluorobutyrate when $x=3$
ethyl ω-cyanohexafluorobutyrate when $x=3$
n-propyl ω-cyanohexafluorobutyrate when $x=3$
n-butyl ω-cyanohexafluorobutyrate when $x=3$
benzyl ω-cyanohexafluorobutyrate when $x=3$
methyl ω-cyanohexadecafluorononanoate when $x=8$
propyl ω-cyanohexadecafluorononanoate when $x=8$
methyl ω-cyanodifluoroacetate when $x=1$
methyl ω-cyanotetrafluoropropionate when $x=2$
methyl ω-cyanooctafluoropentanoate when $x=4$
methyl ω-cyanododecafluoroheptanoate when $x=6$
methyl ω-cyanoperfluorotridecanoate when $x=12$ The alkyl perfluoroalkylene amidate starting materials for this invention are produced either by (a) treatment with ammonia of a diester of a perfluorinated dicarboxylic acid of the formulae:

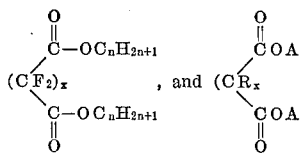

where $x$, $n$ and A are as defined avore, or (b) by treatment of the imide of the perfluorodicarboxylic acid with a corresponding alcohol, after the equations:

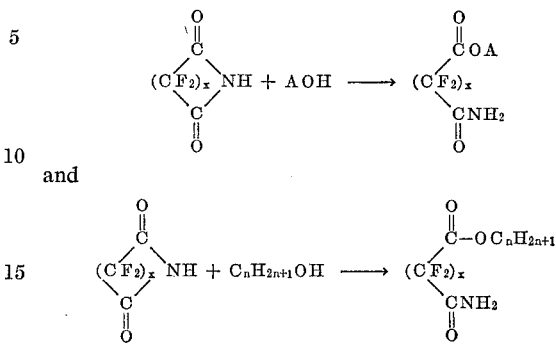

where $x$, $n$ and A are as defined above. This is described in copending application Ser. No. 661,240 filed Aug. 17, 1967. The diesters and imides are known compositions. An example of a dialkyl perfluoroalkylene dicarboxylate is dimethyl perfluoroglutarate which was prepared by A. L. Henne and W. J. Zimmerscheid, J. Am. Chem. Soc. 67, 1235 (1945). Another example is dimethyl perfluorosebacate which was prepared by treatment of perfluorosebacoyl chloride with methanol, and recovering the diester by vacuum distilaltion: B.P. 120–122 at 4 mm. Perfluorosebacoyl chloride B.P. 115–117 at 36 mm. was prepared from the acid in 86% yield using a fourfold quantity of thionyl chloride, ethyl acetate as solvent, and a catalytic amount of pyridine. Perfluorosebacic acid and perfluorotetradecanedioic acid are known compounds described by I. L. Knunyants et al., Proc. Acad. Sci. USSR, 129, 328, (1959) and I. L. Knunyants and M. N. Krasuskaya, Bull. Acad. Sci., USSR, 1963. Dipropyl perfluorosebacate was prepared from perfluorosebacic acid, n-propyl alcohol and a catalytic amount of sulfuric acid. The byproduct water of reaction was removed by distillation of the propyl alcohol-water azeotropic mixture. The dipropyl perfluorosebacate had a boiling point of 125–128° centigrate at 5 millimeters of mercury pressure (absolute). Diethyl difluoromalonate or dimethyl difluoromalonate may be produced by the method of C. E. Inman, R. E. Oesterling, and E. A. Tyczkowski, J. Am. Chem. Cos, 80, 6533–5 (1958). Perfluoropimelic acid, perfluoroazelaic acid and perfluorononanedioic acid may be made by electrolytic fluorination of the corresponding hydrocarbon acids by the method of Guenther, U.S. Pat. No. 2,606,206 which gave perfluorosebacic acid. The esters of these acids can be made by the procedures used for the preparation of the perfluorosebacic acid esters described above. Examples of imides are perfluorosuccinimide and perfluoroglutarimide, which were prepared by the method of A. L. Henne and W. F. Zimmer, J. Am. Chem. Soc., 73, 1103 (1951). Other homologous perfluoroalkanedioic acid imides may be prepared by this process when the corresponding perfluoroalkanedioic acid amides are used as starting materials. The alkyl ω-cyanoperfluoroalkanoates of the present invention are useful intermediates in the preparation of perfluoroalkylene triazine polymers, such as those disclosed in copending application Ser. No. 533,430, filed Mar. 11, 1966. These polymers are thermally stable and resistant to some solvents, while being soluble in other solvents, such as alkyl acetates, alkyl perfluoroalkanoates, and fluorinated solvents, such as fluorinated xylenes and chlorine-containing triazines. The compounds are also useful in the preparation of modified perfluoroalkylene triazine polymers.

The compounds of this invention are prepared by mixing the starting material with phosphorus pentoxide. The order of addition of reactants of one to the other depends upon the equipment being used, but otherwise is not critical.

When preparing the composition in small quantities, such as in a batch operation, the temperature to be used is between about 80 and about 250 degrees centigrade, with a preferred temperature range being between about 110 and about 215 degrees centigrade The same temperature ranges would also be used when preparing larger quantities such as continuously in a kiln type reactor.

No agitation is needed for the reaction, however, it may be useful.

The process is carried out ordinarily at atmospheric pressure. However, pressures both above or below atmospheric pressure, such as at about 20 millimeters of mercury, may also be used.

A solvent is not necessary to effect the reaction. However, an inert diluent may be helpful, especially where agitation is desired. Suitable solvents are nitro benzene, benzo nitrile, and trichloro benzene.

It is important that the reaction be carried out under substantially anhydrous conditions. If not, hydrolyzed materials are obtained instead of the desired products.

The product is recovered ordinarily by distillation off overhead. It may then be further purified by a redistallation of the distillate.

The invention is further illustrated in the examples below, wherein temperatures are in degrees contigrade and parts are by weight.

EXAMPLE 1

Methyl ω-cyanohexadecafluorononanote

A mixture of methyl perfluorosebacamidate (61 grams) and phosphorous pentoxide (185 grams) was heated in a bath maintained at about 200 degrees centigrade. After 15 minutes the presure was reduced to 35 millimeters mercury to permit distillation of the product. Distillate (50.5 grams) boiling at 111–113 degrees centigrade was collected during the next two hours. The distillate was redistilled at 35 millimeters to give a fraction (39 grams) boiling at 112 to 115 degrees centigrade.

Analysis.—Calculated for $C_{11}H_3F_{16}NO_2$ (percent): C, 27.23; H, 0.62; N, 2.89. Found (percent): C, 27.14; H, 0.87; N, 2.91.

In a similar manner, by substituting methyl perfluorosuberamidate (48.8 grams) for the methyl perfluorosebacamidate used in the above reaction methyl ω-cyanododecafluoroheptanoate can be obtained.

In a similar manner, by substituting methyl perfluoroadipamidate (36.7 grams) for the methyl perfluorosebacamidate used in the above reaction, methyl ω-cyanooctafluoropentanoate can be obtained.

In a similar manner, by substituting n-propyl perfluorosebacamidate (64.4 grams) for the methyl perfluorosebacamidate used in the above reaction, n-propyl ω-cyanohexadecafluorononanoate can be obtained.

EXAMPLE 2

Methyl ω-cyanoperfluorobutyrate

Methyl perfluoroglutaramidate (37 grams) was combined with phosphorus pentoxide (40 grams) under nitrogen in a 500 milliliter flask. This was connected to a nitrogen-blanketed distillation head, condenser, and receiver and immersed in a bath maintained at about 200 degrees centigrade. After 10 minutes, distillate started to collect in the receiver and continued for about 2 hours. The crude product was redistilled in a 95 percent yield. It had a boiling point of 116 degrees centigrade at 755 millimeters mercury.

Analysis.—Calculated for $C_6H_3F_6NO_2$ (percent): C, 30.66; H, 1.29; N, 5.96. Found (percent): C, 30.90; H, 1.39; N, 6.11.

In a similar manner, by substituting methyl perfluorosuccinamidate (29.7 grams) for the methyl perfluoroglutaramidate used in the above reaction, methyl ω-cyanoterafluoropropionate can be obtained.

In a similar manner, by substituting methyl difluoromalonamidate (22.3 grams) for the methyl perfluoroglutaramidate used in the above reaction, methyl ω-cyanodifluoroacetate can be obtained.

EXAMPLE 3

Ethyl ω-cyanoperfluorobutyrate

In a manner after Example 2, ethyl ω-cyanoperfluorobutyrate was produced by treatment of ethyl perfluorobutyramidate with phosphorus pentoxide. The boiling point of the product was 125 degrees centigrade.

Analysis.—Calculated for $C_7H_5F_6NO_2$ (percent): C, 33.75; H, 2.02; N, 5.62. Found (percent): C, 33.98; H, 2.09; N, 5.65.

EXAMPLE 4 n-Propyl ω-cyanoperfluorobutyrate

In a manner after Example 2, n-propyl ω-cyanoperfluorobutyrate was produced from n-propyl ω-cyanoperfluorobutyramidate. The product had a boiling point of 144 degrees centigrade.

Analysis.—Calculated for $C_8H_7F_6NO_2$ (percent): C, 36.52; H, 2.68; N, 5.32. Found (percent): C, 36.50; H, 2.50; N, 5.58.

EXAMPLE 5 n-Butyl ω-cyanoperfluorobutyrate

In a manner after Example 2 n-butyl ω-cyanoperfluorobutyrate was prepared from n-butyl perfluoroglutaramidate. The product had a boiling point of 158 degrees centigrade .

Analysis.—Calculated for $C_9H_9F_6NO_2$ (percent): C, 39.00; H, 3.27; N, 5.05. Found (percent): C, 36.94; N, 2.80. The infrared spectrum of the product indicates there was an additional product of perfluoroglutarimide.

EXAMPLE 6

Benzyl ω-cyanohexafluorobutyrate

Benzyl perfluoroglutaramidate (25 grams) and phosphorus pentoxide (75 grams) were mixed and then added to a 150 milliliter round-bottomed flask equipped with a condenser, thermometer, receiver, vacuum adaptor, Dry Ice trap and vacuum pump. The mixture was heated to 200 degrees centigrade and maintained at 20 millimeters mercury vacuum, and the product was distilled overhead. The product had a boiling range between 80 and 82 degrees centigrade at 20 millimeters mercury, which was collected in an ice-cooled receiver. A total of 13.2 grams (61 percent yield) of 90 percent pure product was recovered.

Preparation of alkyl ω-cyanoperfluoroalkanoate starting materials.—In accordance with S.N. 661,240 filed Aug. 17, 1967, the starting materials used to prepare the products of this invention, are prepared in the following illustrative manner.

EXAMPLE 7

Methyl perfluoroglutaramidate

Perfluoroglutarimide (5 grams, 0.023 mole) and methanol (0.79 gram, 0.0246 mole), were sealed in a tube and heated to about 100 degres centigrade. In 50 minutes the reaction was almost complete as indicated by infrared analysis. Heating was continued for about 90 minutes more to complete the reaction. A solid product was recrystallized from toluene and dried. It had a melting point of 45.0–45.5 degrees centigrade.

*Analysis.*—Calculated for $C_6H_5F_6NO_3$ (percent): C, 28.47; H, 1.99; N, 5.53. Found (percent): C, 28.40; H, 1.99; N, 5.62.

In a similar manner, by substituting perfluorosuccinimide (3.93 grams, 0.023 mole) for the perfluoroglutarimide used in the above reaction, methyl perfluorosuccinamidate can be obtained.

EXAMPLE 8

Benzyl perfluoroglutaramidate

In a manner after Example 1 benzyl perfluoroglutaramidate was prepared from perfluoroglutarimide and benzyl alcohol. The product had a melting point of between 61 and 62 degrees centigrade (from toluene).

*Analysis.*—Calculated for $C_{12}H_9F_6NO_3$ (percent): C, 43.78; H, 2.76; N, 4.26. Found (percent): C, 43.61, H, 2.57; N, 4.28.

Although this invention has been illustrated by citing specific details of given species embraced within the scope of this invention, it is to be understood that various modifications within the invention are possible, some of which have been referred to above. For instance, alkyl ω-cyanoperfluoroetheralkanoates may be made. These compounds have the formulae:

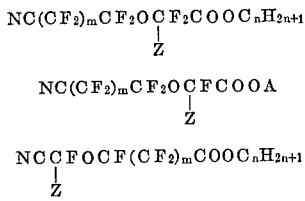

and

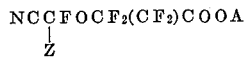

where $m$ is an integer of from 0 to 12, $n$ is an integer of from 1 to 25, and A is aryl-substituted methyl of 7 to 21 carbon atoms,

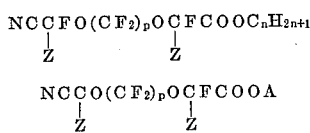

where $p$ is an integer of from 2 to 12, and $n$ and A are as defined above,

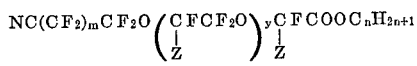

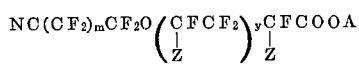

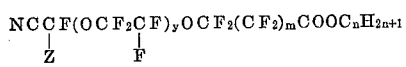

and

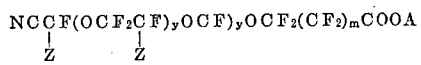

where $y$ is an integer of from 0 to 100, and $p$, $m$, $n$ and A are as defined above, and

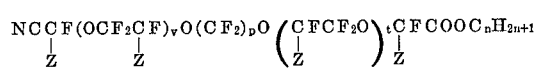

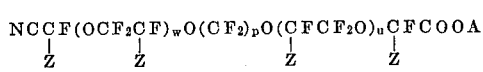

where $u$ plus $w$ is an integer of from 0 to 100, and $p$, $m$, $n$ and A are as defined above, and

 and

when $n$ and A are as defined above. In each of the above formulae Z is selected from the group consisting of fluorine and $CF_3$. Illustrative compounds embraced by this process are:

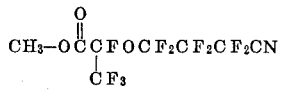

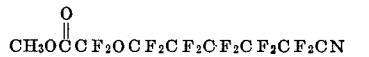

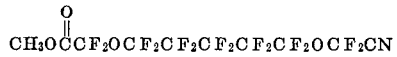

and

Other compounds embraced by this process are alkyl ω-cyanoperfluoroalkanoates of branched perfluoroalkanedioic acids such as the following illustrative examples:

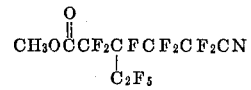

and

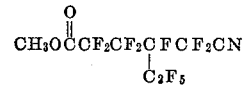

Other starting materials embraced by this invention are haloalkyl perfluoroalkylene amidates of the formula:

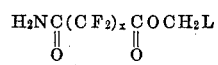

where $x$ is as defined above and L is a haloalkyl of 1 to 24 carbon atoms where the halogen(s) is selected from chlorine and fluorine, with the balance of the haloalkyl group being hydrogen. An example of this type of partially halogenated alcohol ester amidate would be difluoroethyl-hexafluoroglutamidate, and the product, after treatment with $P_2O_5$ in accordance with this invention, would be difluoroethyl ω-cyanohexafluorobutyrate.

What is claimed is:

1. Omega cyanoperfluoroalkanoate esters of the formulae:

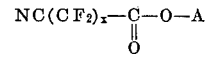

and

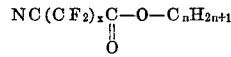

wherein $x$ is from 1 to 12, A is benzyl and $C_nH_{2n+1}$ is lower alkyl.

2. The compound of claim 1 wherein $x$ is 3 and $n$ is 1.
3. The compound of claim 1 wherein $x$ is 3 and $n$ is 2.
4. The compound of claim 1 wherein $x$ is 3 and $n$ is 4..
5. The compound of claim 1 wherein $x$ is 8 and $n$ is 1.

6. The compound of claim 1 wherein $x$ is 3 and A is benzyl.

7. The compound of claim 1 wherein $x$ is 6 and $n$ is 1.

References Cited

UNITED STATES PATENTS

| | | | |
|---|---|---|---|
| 3,248,419 | 4/1966 | Hauptschein et al. | 260—465.4 X |
| 3,271,402 | 9/1966 | Fahrni et al. | 260—465.4 X |
| 3,274,229 | 9/1966 | Verbanic | 260—465.2 |
| 3,349,105 | 10/1967 | Verbanic | 260—465.2 |

LEWIS GOTTS, Primary Examiner

G. HOLLRAH, Assistant Examiner

U.S. Cl. X.R.

260—78.4, 465, 465.4, 482